Sept. 21, 1937.  R. MILLENAAR  2,093,640
COMPOSITE MOLDED PRODUCT AND METHOD AND APPARATUS FOR MAKING SAME
Filed Sept. 5, 1935  3 Sheets-Sheet 1
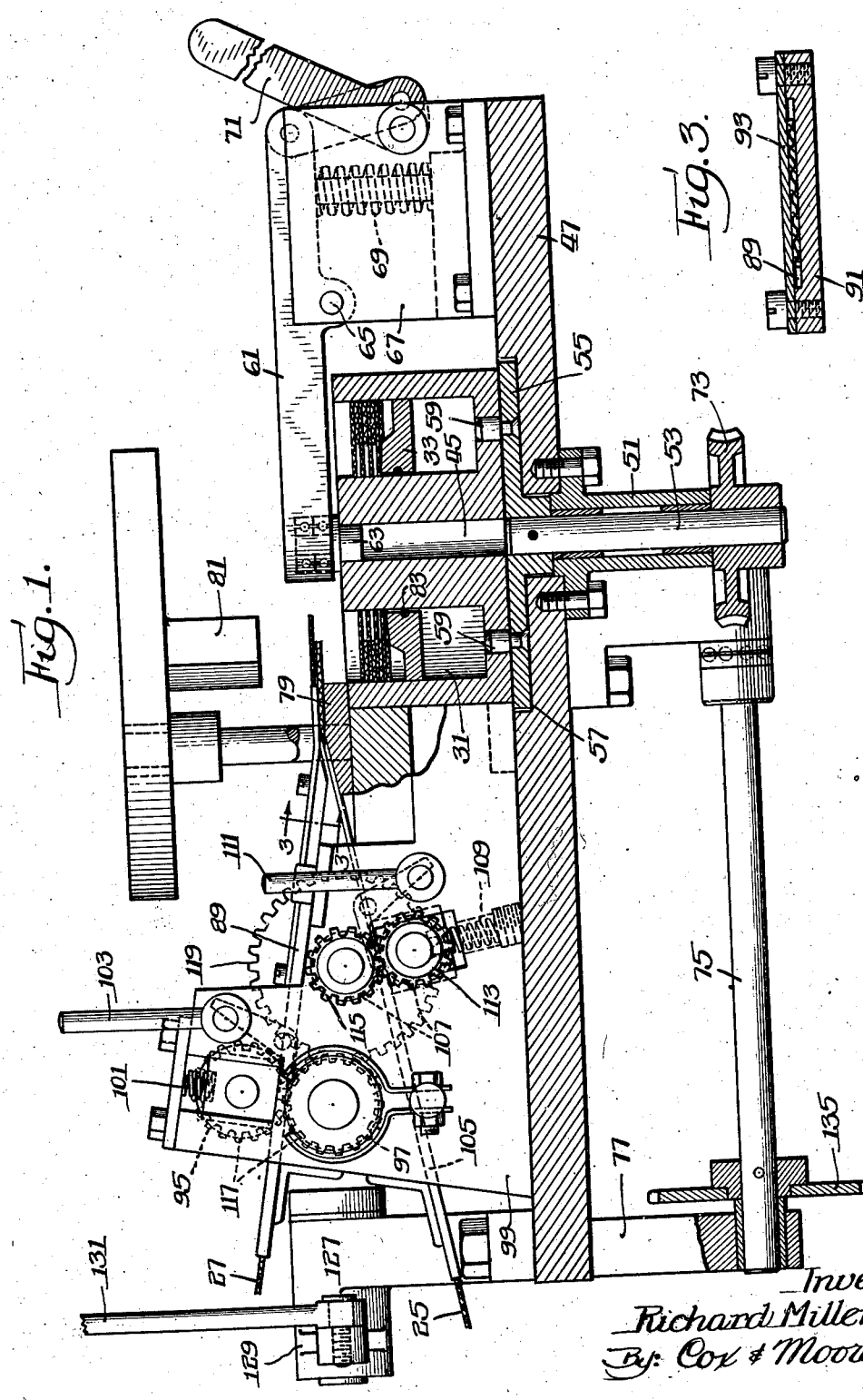
Inventor.
Richard Millenaar
By: Cox & Moore  attys

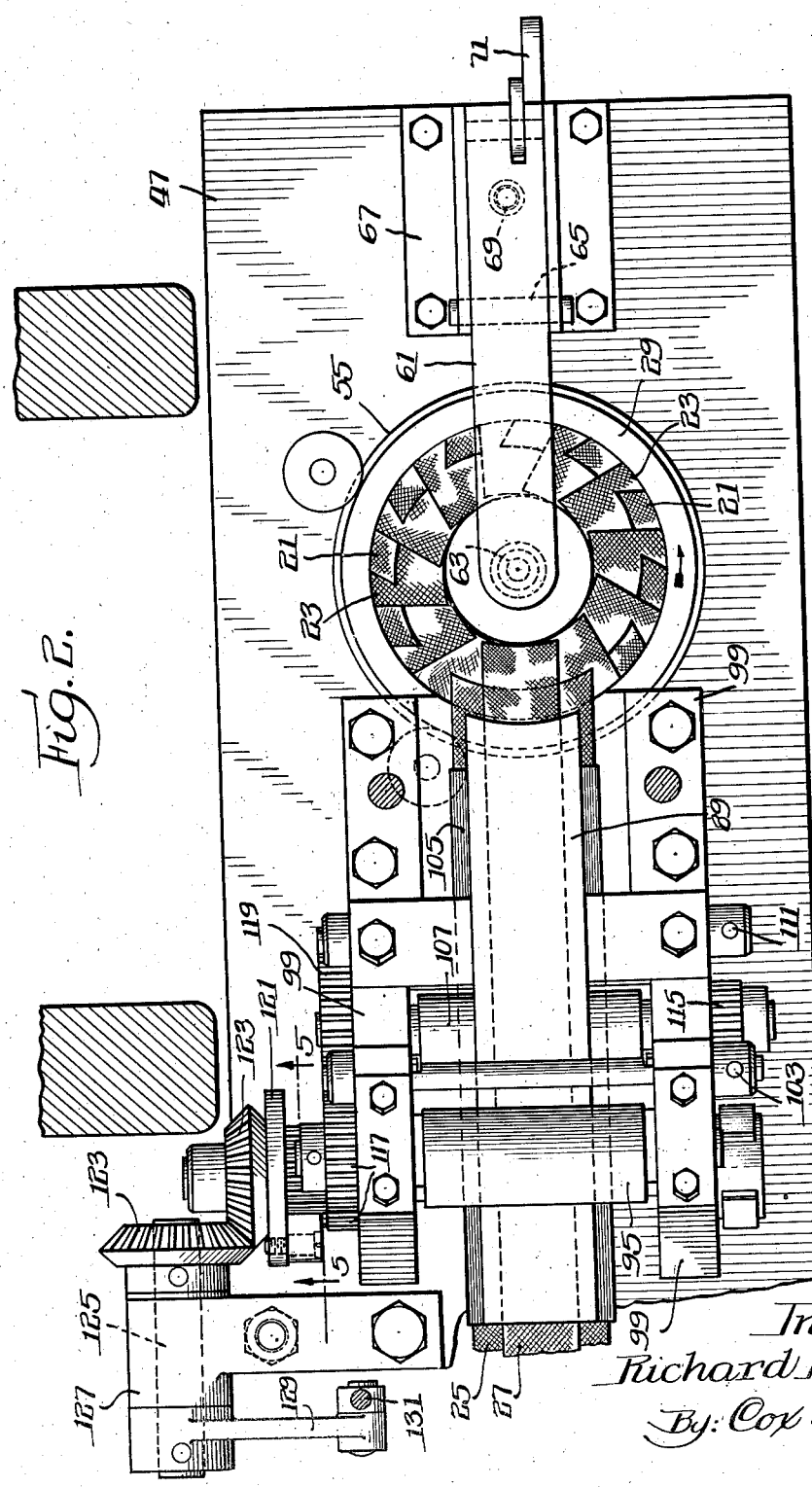

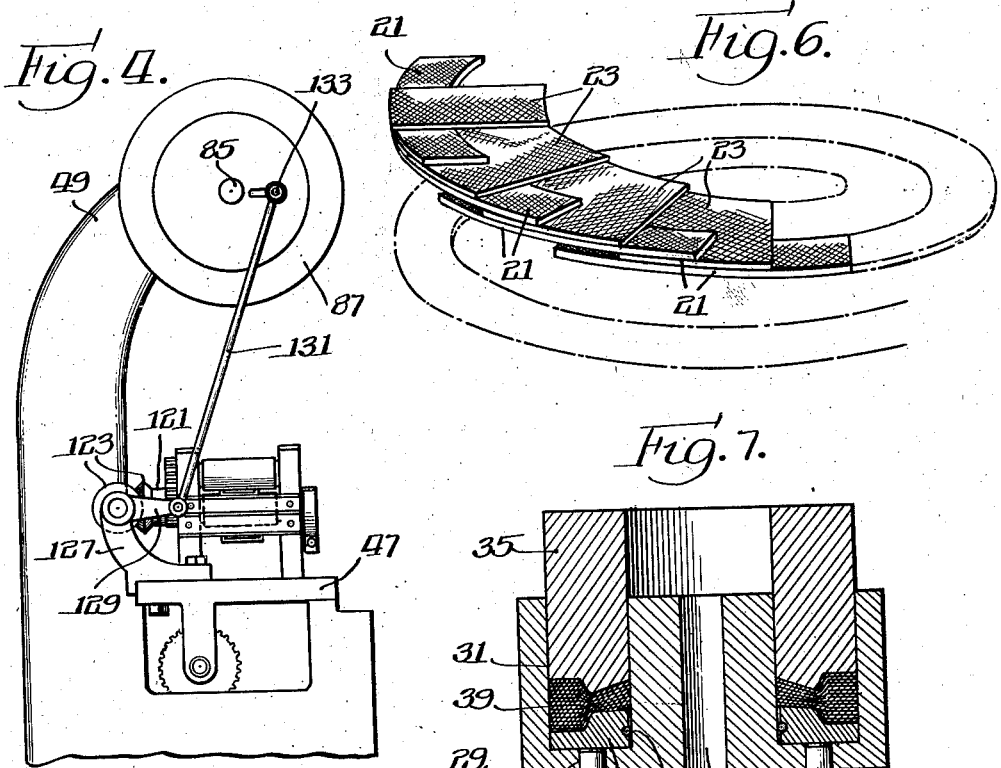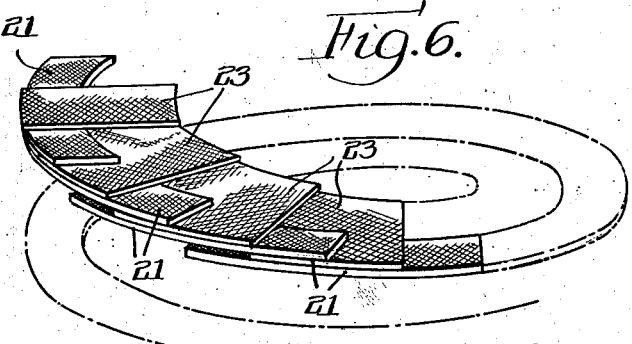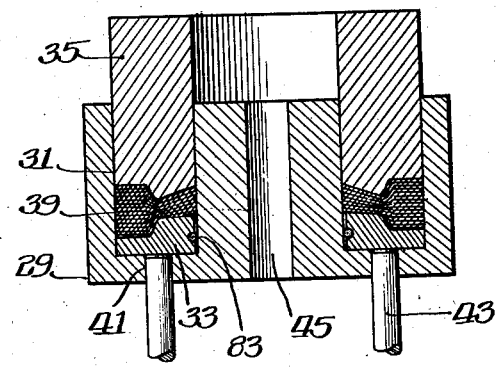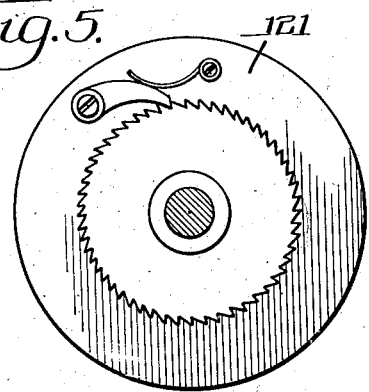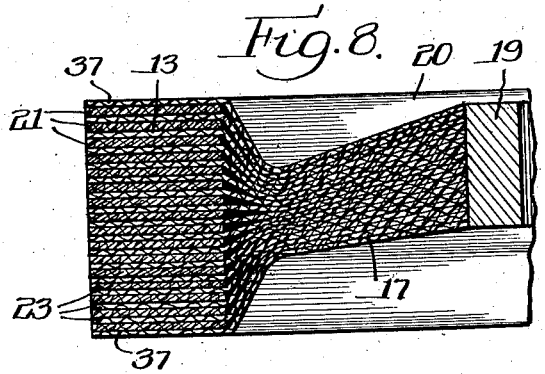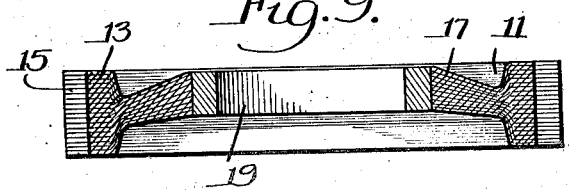

Patented Sept. 21, 1937

2,093,640

UNITED STATES PATENT OFFICE 2,093,640

COMPOSITE MOLDED PRODUCT AND METHOD AND APPARATUS FOR MAKING SAME

Richard Millenaar, Oak Park, Ill., assignor to The Richardson Company, Cincinnati Ohio, a corporation of Ohio Application September 5, 1935, Serial No. 39,321

21 Claims. (Cl. 154—1)

This invention relates in general to molding and has more particular reference to the fabrication of composite molded products, such as gears, gear blanks and the like.

An important object of the invention is to provide an improved gear blank or similar molded product comprising fabric and a binder wherein the blank utilizes all of the material of a stock sheet without wastage.

Another important object is to form a gear blank or the like from segments cut from a pair of stock sheets of unequal width, the segments being formed and arranged to provide uniform distribution of fabric in the resulting blank and to eliminate the production of scrap material in forming the segments.

Another important object is to form a gear blank or the like comprising fabric segments, including a plurality of long, narrow segments and a plurality of short, relatively wide segments, the relatively long, narrow segments forming the rim of the blank and the short, wide segments overlapping the long, narrow segments in the rim and extending inwardly to form the web of the blank; a further object being to arrange the segments in overlapping pairs whereby to obtain in the finished blank a substantially uniform distribution of the fabric.

Another important object is to cut a pair of segments, including a long, narrow segment and a short, wide segment, simultaneously in a suitable punch press and deliver the same simultaneously in a form; a further object being to deliver segment pairs successively in the form in overlapping relationship with respect to a segment pair previously disposed in the form in order to construct the body of a gear blank as a continuous operation.

Another important object is to provide means for delivering sheet material of unlike width continously to a punch press at different rates of speed whereby to produce segment pairs of unlike width and length for assembly in a molding form.

Another important object is to provide apparatus including a punch press and sheeting means, whereby to produce the segment pairs in combination with a form or holder for receiving the segment pairs directly from the punch press in a continuous manner; a further object being to move the holder continuously with respect to and in timed relationship with the operating movement of the punch press.

These and numerous other objects, advantages and inherent functions of gear blanks and the like and apparatus for making the same, in accordance with the present invention, will become apparent as the invention is more fully understood from the following description, which, taken in connection with the accompanying drawings, discloses a gear blank embodying the invention and preferred apparatus for the fabrication of the same.

Referring to the drawings:

Figure 1 is a view in longitudinal section taken through a segment cutting and assembling apparatus embodying the present invention.

Figure 2 is a plan view of the apparatus shown in Figure 1.

Figure 3 is a sectional view taken substantially along the line 3—3 in Figure 1.

Figure 4 is an end view, drawn to reduced scale of the apparatus shown in Figures 1 and 2.

Figure 5 is a sectional view taken substantially along the line 5—5 in Figure 2.

Figure 6 is a diagrammatic view illustrating the relative arrangement of segments as assembled by the apparatus shown in Figures 1 through 4.

Figure 7 is a sectional view through a form or die in which the segments are assembled and pressed.

Figure 8 is a sectional view taken partially through a blank after pressing.

Figure 9 is a sectional view taken through a gear blank embodying the teachings of the present invention.

To illustrate the invention the drawings show a molded product 11, namely, a composite gear comprising a rim 13 containing cut gear teeth 15, a web 17 and a hub 19 although it will be obvious that the invention is not necessarily restricted to a gear but may be applied to advantage in the production of other molded products. The gear, of course, is formed from a blank 20 by cutting teeth in the rim of the blank 1 comprising a plurality of long segments 21 of narrow depth arranged in staggered relationship with narrow segments 23 of relatively greater depth also arranged in relatively staggered relationship and inter-leaved at one end with the long segments 21, the narrow segments 23 extending inwardly of the long segments and forming the web 17. The hub 19 may be of any preferred structure and, preferably, comprises an annular metallic element upon which the web segments are molded.

The blank may be formed by cutting the segments from stock sheets 25 and 27 of unequal width and arranging the segments in staggered relationship in a mold or form 29. The stock sheets may be of any suitable fabric, preferably treated by impregnation with a suitable, preferably thermoplastic binder, such as, the condensation product of phenol and formaldehyde, the form 29 comprising an element having an annular groove 31 for receiving the segments. The bottom of the groove may be formed as by the assembly therein of an annular insert ring 33 to a desired shape corresponding with the shape of one side of the finished blank and, after the segments have been stacked in the groove upon the ring 33, an annular pressing element or die 35 may be forced into the groove on top of the segments in order to press the same together and to form the blank, the lower end of the die 35 being configurated to shape the upper side of the blank.

If desired, the pressing operation may be accomplished by the application of heat in order to finally cure and set the resinous binder; however, it is preferable to only partially press the blank and cure the resin in the form 29 in order to produce an intermediate blank which may thereafter be assembled in a suitable pressing die with the hub element 19 and therein finally compacted to finished form and solidified on the hub element 19. If desired, a finishing sheet 37 may be applied to the opposite faces of the blank in position to cover the entire superficial area. Such sheets may be applied in the form 29 but are preferably applied in the finishing die in which the gear blank is finally formed to finished condition.

In order to provide for ejecting the blank 39 from the stock sheet 27, a plurality of perforations 41 may be formed in said die to receive ejecting pins 43 by means of which the ring 33, carrying with it the pressed blank 39, may be easily removed from the form.

In order to facilitate production of the segments 21 and 23 and assembly thereof in the form 29 as a continuous, automatic process, the form 29 is formed with a central opening 45 and is adapted for mounting in an automatic sheet cutting and segment assembling machine comprising a frame 47 forming the bed plate of a punch press 49. The bed plate 49 has sleeve-like means 51 forming a bushing for the reception of a shaft 53, one end of which is drivingly connected with a plate 55 sunk in a seat or socket 57 in the upper surface of the bed plate in position to receive the form 29, said plate having projections 59 adapted to engage the perforations 41 in the bottom of the form so that the form may be aligned on the plate and turned in response to rotation of the plate 55.

In addition, a holder comprising a lever 61 having an end positioned to overlie the form 29 is provided to secure the form 29 on the plate 55, said lever 61 having a plug 63 rotatingly carried thereon in position to enter the upper end of the central opening 45. The lever is tiltably mounted as at 65 in a bracket 67 carried by the frame 47. Spring means 69 on the bracket 67 normally urges the lever 61 toward a position securing the form 29 on the plate 55. Toggle means, including a release handle 71, is carried by the bracket 67 and operatively associated with the lever to move the same against the spring 69 to raise the projections 63 from form holding position in order to release the form and thus permit the same to be mounted or dismounted from the plate 55.

The shaft 53 is provided with a worm wheel 73 and the frame 47 carries a shaft 75 journalled in a frame extension 77 and having a worm in driving engagement with the worm wheel 73 whereby the plate 55 and the form 29 carried thereon may be rotated in response to rotation of the shaft 75. The form 29 is positioned in the frame to rotate continuously beneath a stationary cutting element 79 and the punch press includes a shiftable cutter 81 adapted at intervals to cooperate with the stationary cutting element 79 to cut fabric strips interposed therebetween in order to produce the segments 21 and 23 in such position that the cutting movement of the shiftable cutter 81 also forces the cut segments 21 and 23 into the slowly rotating form 29. The ring 33 in the form 29 is preferably formed with a friction spring 83 which yieldingly holds the ring 33 in the groove 31 so that the cut segments are positioned directly in the groove upon previously cut segments and in a desired staggered relationship by the operating stroke of the cutter 81. Any suitable means may be employed for driving the cutter 81 in the punch press, said means including a rotating shaft 85 and a flywheel 87 and means are provided on the frame 47 for continuously delivering stock sheets 25 and 27 to the cooperating cutting element 79 and cutter 81. The sheets 25 and 27 are delivered to the cutting element 79 and cutter 81 at unlike rates of speed so that longer segments are cut from one sheet than are cut from the other as a result of each stroke of the cutting element 79 and cutter 81. To this end the sheet 27 is delivered to the cutting element 79 and cutter 81 through a channel 89 provided by a grooved slide-way 91 and a cover 93 for retaining the sheet in the slide-way. During its passage through the slide-way, the sheet 27 travels between a pair of rollers 95 and 97 which are journalled on a bracket 99 by the frame 47. The roller 97 is mounted for rotation in fixed position in the bracket 99 while the roller 95 is shiftably mounted in position to move away from the roller 97, a spring 101 being provided to normally urge the roller 95 toward the roller 97 in order to grip the sheet 27 which passes therebetween. Means, including a handle 103, is provided for raising the roller 95 to permit the sheet to be introduced between the rollers. The stock sheet 25, which is relatively wider than the stock sheet 27, is delivered to the cutting element 79 and cutter 81 along a way 105 similar to the channel 89, the channel 89 and way 105 being arranged to deliver the stock sheet 27 in superposed and centralized position with respect to the sheet 25. In traveling through the way 105, the sheet 25 passes between a pair of rollers 107, one of which is stationarily mounted in the bracket 99 and the other of which is yieldingly mounted in said bracket, a spring 109 being provided to urge said yieldingly mounted roller against its cooperating roller and means, including a handle 111 similar to the handle 103, is provided for shifting the yieldingly mounted roller 107 against the force of the spring 109.

The rollers 107 are drivingly connected by means of the gears 113 and 115 and the rollers 95 and 97 are likewise drivingly connected by the intermeshing gears 117, one of which also drivingly engages a gear 119 which is connected to drive the stationarily mounted roller 107. The roller 97 is drivingly connected as by means of a pawl and ratchet mechanism 121 and the beveled gears 123 with a shaft 125 journalled in a bracket 127 carried by the frame 47 and carrying an arm 129, the end of which is connected as by a rod 131 with the flywheel 87, said rod having a bearing receiving a pin 133 radially adjustable on the flywheel. As the flywheel rotates, the connecting rod 131 will cause the arm 129 and the shaft 125 to oscillate at a rate determined by the speed of the flywheel, that is to say, in proportion to the stroking frequency of the cutter 81. The arm 129 and the shaft 125 also will be oscillated through an angular displacement determined by the distance between the pin 133 and the axis of the flywheel. This movement through the pawl and ratchet 121 will be imparted to the rollers 95 and 97 and in turn to the rollers 107 through the driving connection therewith afforded by the gear 119. Consequently, the rollers will advance a predetermined length of the stock sheet 27 to the cutter during each stroke of the cutter. A somewhat lesser length of the stock sheet 25 will also be advanced to the cutter. The mechanism is arranged so that the advancing movement is accomplished when the cutter is in raised position, the stock sheets being preferably stationary during the cutting stroke of the cutter. In any event the cutter will simultaneously cut off unequal lengths of the stock sheets and deposit the same as segments in the form 29. The shaft 75 is provided with a gear or sprocket 135 and suitable driving means, such as, a pinion, may be provided for driving the gear from the shaft of the flywheel.

It will be seen from the foregoing that the production of the segments and assembly thereof in the form may be accomplished entirely automatically and it is simply necessary to stop the machine after a predetermined number of segments have been assembled in the form. The form may then be removed and replaced by an empty form and the process repeated indefinitely.

It will also be seen that all of the material of both stock sheets is used in the resulting blank. There is no scrap fabric and the fabric is substantially uniformly distributed in the blank as a result of the segment arrangement. The resulting product also has unusual strength due to the fabric arrangement therein.

The apparatus is relatively simple and efficient and results in the production of gear blanks and the like at extremely low cost.

It is thought that the invention and numerous of its attendant advantages will be fully understood from the foregoing description and it is obvious that numerous changes may be made in the form, construction and arrangement of the several parts without departing from the spirit or scope of the invention or sacrificing any of its attendant advantages, the form herein disclosed being merely a preferred embodiment for the purpose of illustrating the inventive concept.

The invention is hereby claimed as follows:

1. A composite element comprising a rim and a web and formed of relatively overlapping segment sets, each segment set comprising a relatively long rim segment of narrow depth and a relatively narrower segment of greater depth having an end stacked with respect to the rim segment and extending therefrom to provide a web-forming portion.

2. A composite element comprising a rim and a web and formed of relatively overlapping segment sets helically arranged in the finished element, each segment set comprising a relatively long, curved segment of narrow depth and a relatively narrow segment of greater depth having an end overlapping the curved segment and extending substantially radially inwardly of the curved segment toward its center of curvature.

3. A composite element comprising a rim and a web and formed of relatively overlapping segment sets, each segment set comprising a relatively long segment of narrow depth and a relatively narrow segment of greater depth and having an end overlapping the long segment substantially centrally thereof.

4. A composite element comprising segment sets comprising each a pair of segments in stacked relationship, the segments of a set being of unlike configuration, said sets being arranged helically in relatively offset position and being compacted to form the body of said element.

5. A composite element comprising a plurality of segment sets, each comprising stacked segments including a relatively long segment of narrow depth and a relatively narrow segment of greater depth, said segment sets being arranged helically in relatively offset relationship and compacted together to form the body of the composite element.

6. A composite element comprising segment sets comprising each a pair of segments in stacked relationship, corresponding dimensions of the segments of a set being of different size whereby each segment has portions projecting beyond a marginal edge of the other, said sets being arranged helically in relatively offset position and being compacted to form the body of said element.

7. Apparatus comprising a cutting die, means for supporting a holder adjacent said cutting die in position to receive elements cut by the die, and means to deliver stock sheets in superposed relationship to said die at unequal rates of speed, whereby to cut segments from said sheets and deliver the same in said holder.

8. Apparatus comprising a cutting die, means for supporting a holder adjacent said cutting die in position to receive elements cut by the die, means to deliver stock sheets in superposed relationship to said die to unequal rates of speed, whereby to cut segments from said sheets and deliver the same in said holder, and means to adjust the rate at which at least one of said sheets is advanced to the die.

9. Apparatus comprising a cutting die, means for supporting a holder adjacent said cutting die in position to receive elements cut by the die, and means to deliver stock sheets in superposed relationship to said die at unequal rates of speed, whereby to cut segments from said sheets and deliver the same in said holder, the rate of movement of at least one of the sheets to said die having a fixed relationship with respect to the stroking frequency of the die.

10. Apparatus comprising a cutting die, means for supporting and rotating an annular holder adjacent said cutting die in position to receive elements cut by the die, and means to deliver stock sheets in superposed relationship to said die, whereby to cut segments from said sheets and deliver the same in said holder, the rate of movement of the sheets to said die having a predetermined relationship with respect to the stroking frequency of the die and the rate of rotation of said holder also having a predetermined relationship with respect to the stroking frequency of the die, whereby said segments may be deposited in the die in overlapping relationship.

11. Apparatus comprising a cutting die, means for supporting a holder adjacent said cutting die in position to receive elements cut by the die, and means to deliver stock sheets in superposed relationship to said die at different rates, whereby to cut segment sets of unlike depth from said sheets and deliver the same in superposed relationship in said holder.

12. Apparatus comprising a cutting die, means for supporting a holder adjacent said cutting die in position to receive elements cut by the die, means to deliver stock sheets in superposed relationship to said die at different rates, whereby to cut segment sets of unlike depth from said sheets and deliver the same in superposed relationship in said holder, and means to shift said holder with respect to said die, whereby to arrange successive segment sets in relatively staggered relationship in said die.

13. Apparatus comprising a cutting die, means for supporting and rotating an annular holder adjacent said cutting die in position to receive elements cut by the die, and means to deliver stock sheets of different widths in relatively centered and superposed relationship to said die at different rates, whereby to cut segment sets of unlike width and depth from said sheets and deliver the same in superposed relationship in the holder, whereby to arrange successive segment sets in relatively staggered relationship in the holder.

14. Apparatus comprising a cutting die, means for supporting a holder adjacent said cutting die in position to receive elements cut by the die, means to deliver stock sheets in superposed relationship at different rates of speed to said die, whereby to cut segments of unlike length and depth from said sheets and to deliver the same in stacked segment sets into said holder, and means to shift the holder with respect to the die at a predetermined rate with respect to the stroking frequency of the die, whereby successive segment sets are arranged in a desired offset relationship in the holder.

15. Apparatus comprising a cutting die, means for supporting a holder adjacent said cutting die in position to receive elements cut by said die, means to deliver stock sheets in superposed relationship at different rates of speed to said die, whereby to cut segments of unlike length and depth from said sheets and deliver the same in stacked segment sets into said holder, and means to shift said holder with respect to said die in order to deposit the segment sets in the holder in relatively staggered relationship.

16. Apparatus comprising a cutting die, means for supporting a holder adjacent said cutting die in position to receive elements cut by said die, and means to deliver stock sheets in superposed relationship at different rates of speed to said die, whereby to cut segments of unlike length and depth from said sheets and deliver the same in said holder.

17. Apparatus comprising a cutting die, means for supporting a holder adjacent said die in position to receive elements cut by the die, means to deliver stock sheets in superposed relationship to said die at different rates of speed whereby to cut segment sets of unlike depth from said sheets and deliver the same in superposed relationship in said holder, and means to adjust the ratio of the stroking frequency of said die with respect to the speed of delivery of at least one of said sheets.

18. Apparatus comprising a cutting die, means for supporting a holder adjacent said die in position to receive elements cut by the die, means to deliver stock sheets in superposed relationship to said die at different rates of speed whereby to cut segment sets of unlike depth from said sheets and deliver the same in superposed relationship in said holder, and means to adjust the ratio of the stroking frequency of said die with respect to the speed of delivery of said sheets.

19. The method of fabricating annular composite elements which comprises delivering sheets of material in relatively superposed relationship at unequal rates of speed to a cutter, operating the cutter at intervals to sever segments of unequal depth from said sheets to provide segment sets comprising stacked segments of unlike configuration, and then arranging the segment sets helically in relatively offset relationship and finally compressing the same to form the annular elements.

20. The method of fabricating laminated segment sets which comprises delivering stock sheets in relatively superposed relationship at unlike rates of speed to a cutter while operating the cutter at intervals whereby to sever from said sheets segments of unlike configuration in stacked relationship forming laminated segment sets.

21. The method of fabricating annular composite elements which comprises delivering stock sheets of material of unlike width in relatively superposed relationship to a cutter at unequal rates of speed, operating the cutter at intervals to sever segments of unequal length and depth from said sheets in stacked relationship, forming segment sets cut successively from the sheets, arranging said segment sets helically and in relatively offset position, and finally compressing the same to form the annular element.

RICHARD MILLENAAR.